(12) United States Patent
Lin

(10) Patent No.: US 12,541,879 B2
(45) Date of Patent: Feb. 3, 2026

(54) CALIBRATION TARGETS AND AUTONOMOUS VEHICLE SYSTEMS FOR COMMUNICATING WITH SAME

(71) Applicant: Torc Robotics, Inc., Blacksburg, VA (US)

(72) Inventor: Po-wei Lin, Montreal (CA)

(73) Assignee: TORC ROBOTICS, INC., Blacksburg, VA (US)

( * ) Notice: Subject to any disclaimer, the term of this patent is extended or adjusted under 35 U.S.C. 154(b) by 0 days.

(21) Appl. No.: 18/767,720

(22) Filed: Jul. 9, 2024

(65) Prior Publication Data
US 2026/0017822 A1 Jan. 15, 2026

(51) Int. Cl.
*G06T 7/80* (2017.01)
*B60W 50/06* (2006.01)

(52) U.S. Cl.
CPC .............. *G06T 7/80* (2017.01); *B60W 50/06* (2013.01); *G06T 2207/30204* (2013.01); *G06T 2207/30252* (2013.01)

(58) Field of Classification Search
CPC ............. G06T 7/80; G06T 2207/30204; G06T 2207/30252; B60W 50/06
See application file for complete search history.

(56) References Cited

U.S. PATENT DOCUMENTS

| | | | | |
|---|---|---|---|---|
| 7,034,930 B1 * | 4/2006 | Subramanian | ..... | G01N 21/9501 356/397 |
| 9,589,348 B1 * | 3/2017 | Linde | .................. | H04N 17/002 |
| 9,933,515 B2 | 4/2018 | Prokhorov | | |
| 9,952,317 B2 | 4/2018 | Valois et al. | | |
| 10,070,903 B2 * | 9/2018 | Blau | ..................... | A61B 17/746 |
| 10,430,970 B2 | 10/2019 | Bier | | |
| 10,746,858 B2 | 8/2020 | Bradley et al. | | |
| 10,775,488 B2 | 9/2020 | Bradley et al. | | |
| 10,942,045 B1 | 3/2021 | Crawford et al. | | |
| 11,087,496 B2 | 8/2021 | Agarwal | | |
| 11,366,233 B2 | 6/2022 | Chang | | |
| 11,435,456 B2 | 9/2022 | Abari et al. | | |
| 11,482,008 B2 | 10/2022 | Huang et al. | | |
| 11,520,024 B2 | 12/2022 | Yu et al. | | |

(Continued)

FOREIGN PATENT DOCUMENTS

| | | | | | |
|---|---|---|---|---|---|
| TW | | 202201178 A | * | 1/2022 | ........... H04L 67/142 |
| WO | WO-2018144582 | | * | 1/2018 | |
| WO | WO-2022192368 | | * | 3/2022 | |

OTHER PUBLICATIONS

Sivalingam, Ravishankar translation of TW 202201178 A Apr. 27, 2021 (Year: 2021).*

*Primary Examiner* — Zaihan Jiang
(74) *Attorney, Agent, or Firm* — Armstrong Teasdale LLP

(57) ABSTRACT

Calibration targets including patterns are disclosed. The calibration targets are visually displayed on carrier components and include an internal circular region, and a plurality of pattern fiducials positioned within the internal circular region. The plurality of pattern fiducials define a fiducial pattern of the calibration target. Additionally, the calibration target includes a plurality of reference points circumferentially disposed within and around a perimeter of the internal circular region, and a hexagonal border surrounding the internal circular region including the plurality of pattern fiducials and the plurality of reference points.

20 Claims, 8 Drawing Sheets

(56) References Cited

U.S. PATENT DOCUMENTS

| | | | |
|---|---|---|---|
| 11,594,037 B1 | 2/2023 | Grossman et al. | |
| 11,609,315 B2 | 3/2023 | Rohatgi et al. | |
| 2002/0143276 A1* | 10/2002 | Ernst | G06Q 10/10 |
| | | | 128/923 |
| 2007/0268306 A1* | 11/2007 | Webb | H04N 9/3147 |
| | | | 345/600 |
| 2011/0204508 A1* | 8/2011 | Yoon | H01L 21/561 |
| | | | 257/E23.116 |
| 2015/0333014 A1* | 11/2015 | Wirz | H01L 21/76871 |
| | | | 257/774 |
| 2018/0067198 A1 | 3/2018 | Valois et al. | |
| 2019/0164265 A1* | 5/2019 | Liao | G06T 7/001 |
| 2020/0150347 A1* | 5/2020 | Paquet | G02B 6/0238 |
| 2020/0241207 A1* | 7/2020 | Razdan | G02B 6/30 |
| 2021/0316743 A1 | 10/2021 | Chang | |
| 2021/0398314 A1* | 12/2021 | Sivalingam | H04N 23/90 |
| 2022/0171060 A1 | 6/2022 | Zhu | |
| 2022/0187432 A1 | 6/2022 | Wang | |
| 2023/0088398 A1 | 3/2023 | Brühlmeier et al. | |
| 2023/0089832 A1 | 3/2023 | Soon et al. | |
| 2023/0145082 A1 | 5/2023 | Naikal et al. | |
| 2023/0332925 A1 | 10/2023 | Yox et al. | |
| 2023/0399015 A1 | 12/2023 | Kothari et al. | |
| 2024/0341820 A1* | 10/2024 | Gallant | A61B 17/7047 |

\* cited by examiner

CALIBRATION TARGETS AND AUTONOMOUS VEHICLE SYSTEMS FOR COMMUNICATING WITH SAME

TECHNICAL FIELD

The field of the disclosure relates generally to calibration targets and, more specifically, calibration targets including patterns and autonomous vehicle systems for communicating with and utilizing the calibration targets for performing calibration processes.

BACKGROUND OF THE INVENTION

Previous approaches to calibration markers for imaging systems have typically involved using simple geometric shapes or patterns to facilitate calibration processes. These calibration markers often include basic shapes (e.g., circles, squares), which are used as reference points for aligning and calibrating imaging devices. Additionally, some calibration markers have incorporated fiducial patterns consisting of lines, dots, or other simple geometric elements to aid in the calibration process by providing known reference points for image analysis and adjustment. For example, the ArUco markers depict a square including a plurality of color contrasting quadrilateral shapes contained within a square. The ArUco markers allow image capturing devices and computer devices to detect or determine 6D position estimations (e.g., 3D location and 3D orientation), which in turn can be utilized in a calibration process for the same image capturing devices.

Existing calibration markers provided a certain level of functionality for calibrating imaging systems. However, limits remain in conventional calibration markers. Limitations of the functionality and/or accuracy of current calibration markers is due, at least in part, to the current geometric configurations used to form such markers. As such the precision, flexibility, and reliability in calibration processes are sub-optimal.

It would be beneficial to have a more sophisticated calibration marker or target that provides more accurate and/or enhanced capabilities to improve calibration processes for sensors of imaging systems.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed provides a calibration target visually displayed on a carrier component. The calibration target includes: an internal circular region; a plurality of pattern fiducials positioned within the internal circular region, the plurality of pattern fiducials defining a fiducial pattern; a plurality of reference points circumferentially disposed within and around a perimeter of the internal circular region; and a hexagonal border surrounding the internal circular region including the plurality of pattern fiducials and the plurality of reference points.

In another aspect, the disclosed provides a system including: at least one calibration target visually displayed on a carrier component and including: an internal circular region; a plurality of pattern fiducials positioned within the internal circular region, the plurality of pattern fiducials defining a fiducial pattern; a plurality of reference points circumferentially disposed within and around a perimeter of the internal circular region; and a hexagonal border surrounding the internal circular region including the plurality of pattern fiducials and the plurality of reference points; and an autonomous vehicle in operable communication with the at least one calibration target, the autonomous vehicle including: a plurality of sensors configured to generate an output signal relating to the at least one calibration target; and at least one autonomous vehicle computing system in electronic communication with the plurality of sensors, the at least one autonomous vehicle computing system configured to calibrate the plurality of sensors by performing processes including: obtaining the generated output signal generated by each of the plurality of sensors; determining, based on the obtained output signals, a location and an orientation of the plurality of pattern fiducials and the plurality of reference points; and calibrating at least one sensor of the plurality of sensors based on at least one of the determined location or the determined orientation of the plurality of pattern fiducials or the plurality of reference points.

In yet another aspect, the disclosed provides a method of calibrating a plurality of sensors of an autonomous vehicle. The method including: obtaining an output signal generated by each of the plurality of sensors, the output signal relating to a calibration target visually displayed on a carrier component and including: an internal circular region; a plurality of pattern fiducials positioned within the internal circular region, the plurality of pattern fiducials defining a fiducial pattern; a plurality of reference points circumferentially disposed within and around a perimeter of the internal circular region; and a hexagonal border surrounding the internal circular region including the plurality of pattern fiducials and the plurality of reference points; determining, based on the obtained output signals, a location and an orientation of the plurality of pattern fiducials and the plurality of reference points; and calibrating at least one sensor of the plurality of sensors based on at least one of the determined location or the determined orientation of the plurality of pattern fiducials or the plurality of reference points.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
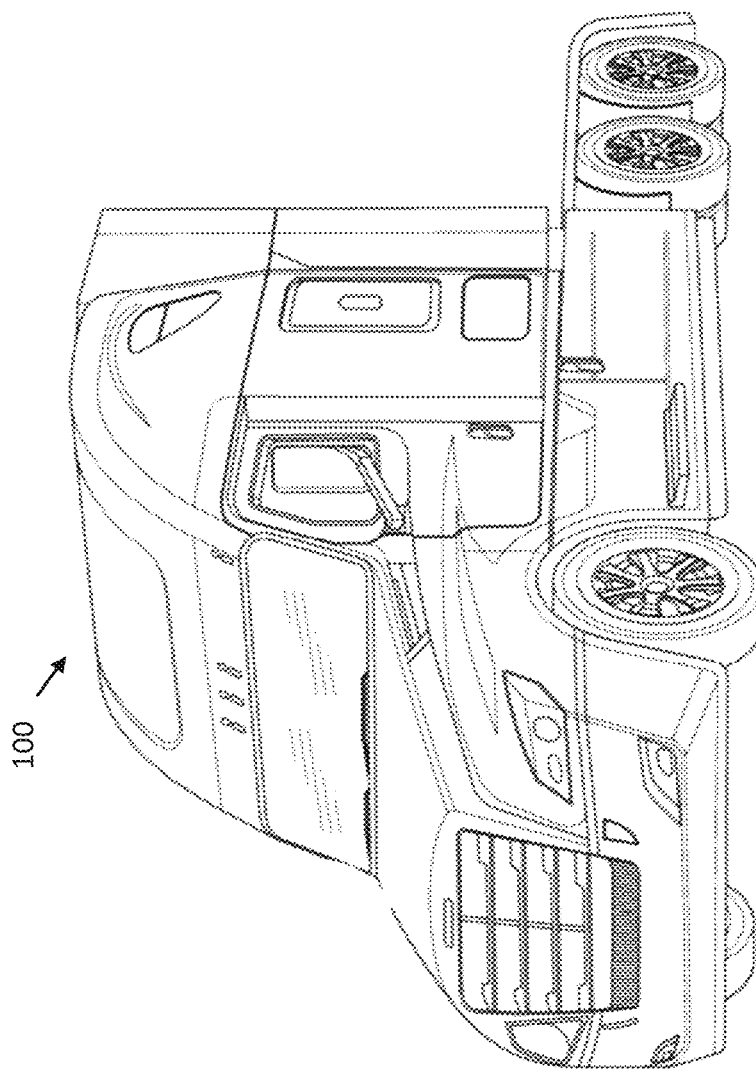
FIG. 1 is a perspective view of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

As discussed herein, the disclosure relates generally to calibration targets and, more specifically, calibration targets including patterns and autonomous vehicle systems for communicating with and utilizing the calibration targets for performing calibration processes. These and other examples are discussed below with reference to FIGS. 1-8.

Figure 2:
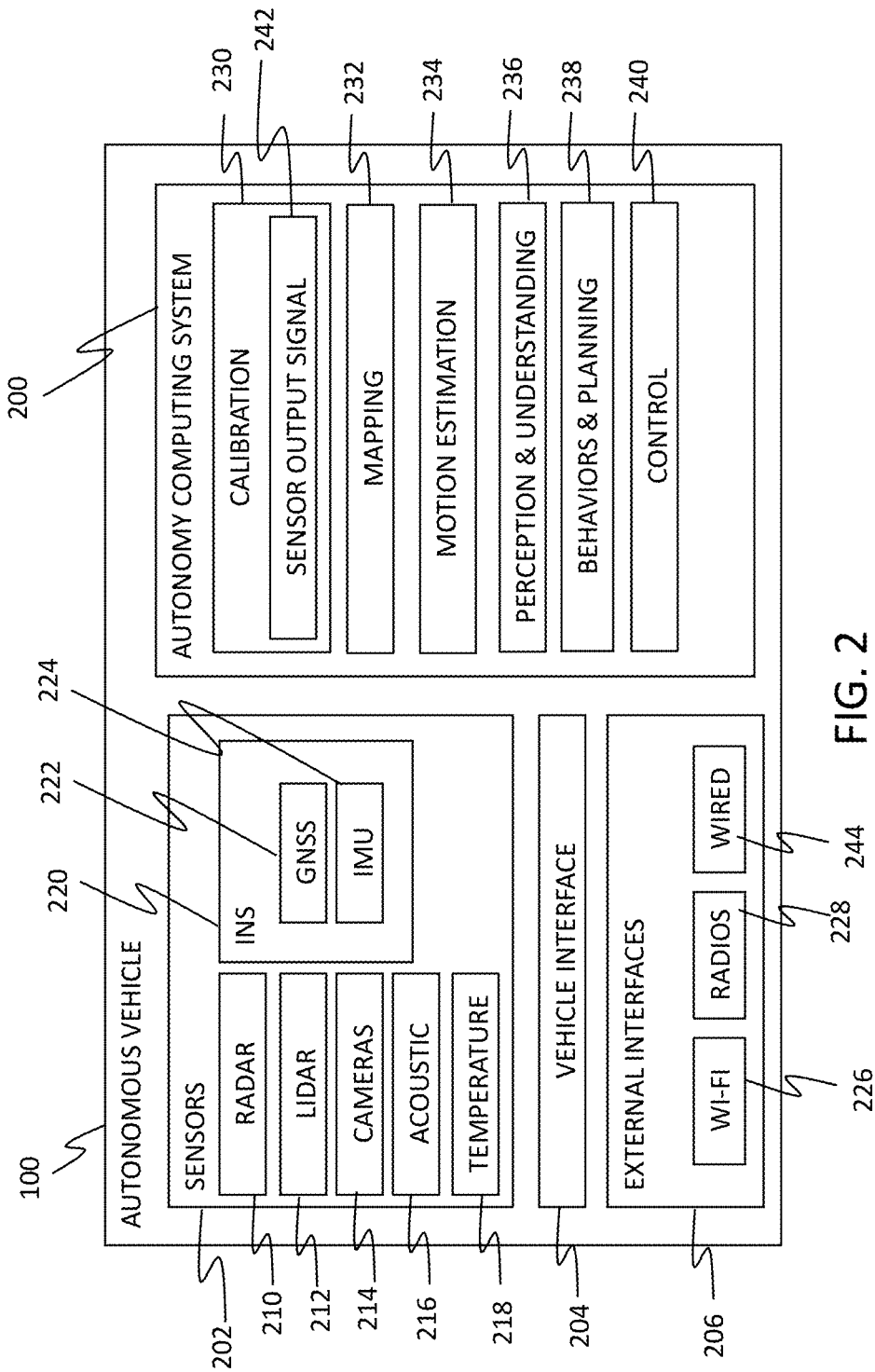
FIG. 2 is a block diagram of the autonomous vehicle of FIG. 1.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operation of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. Radar sensors 212 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and sensor output signal module 242. Sensor output signal module 242, for example, may be embodied within another module, such as behaviors and calibration module 230, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Sensor output signal module 242 aids in storing and/or analyzing sensor output signals that are generated during a calibration process for sensors 202, as discussed herein. Additionally, or alternatively, sensor output signal module 242 includes information pertaining to sensors 202 including, but not limited to, the various types of sensors included within autonomous vehicle 100, the location and/or orientation of each sensor 202, and historical calibration data (e.g., last date of calibration), and the like.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
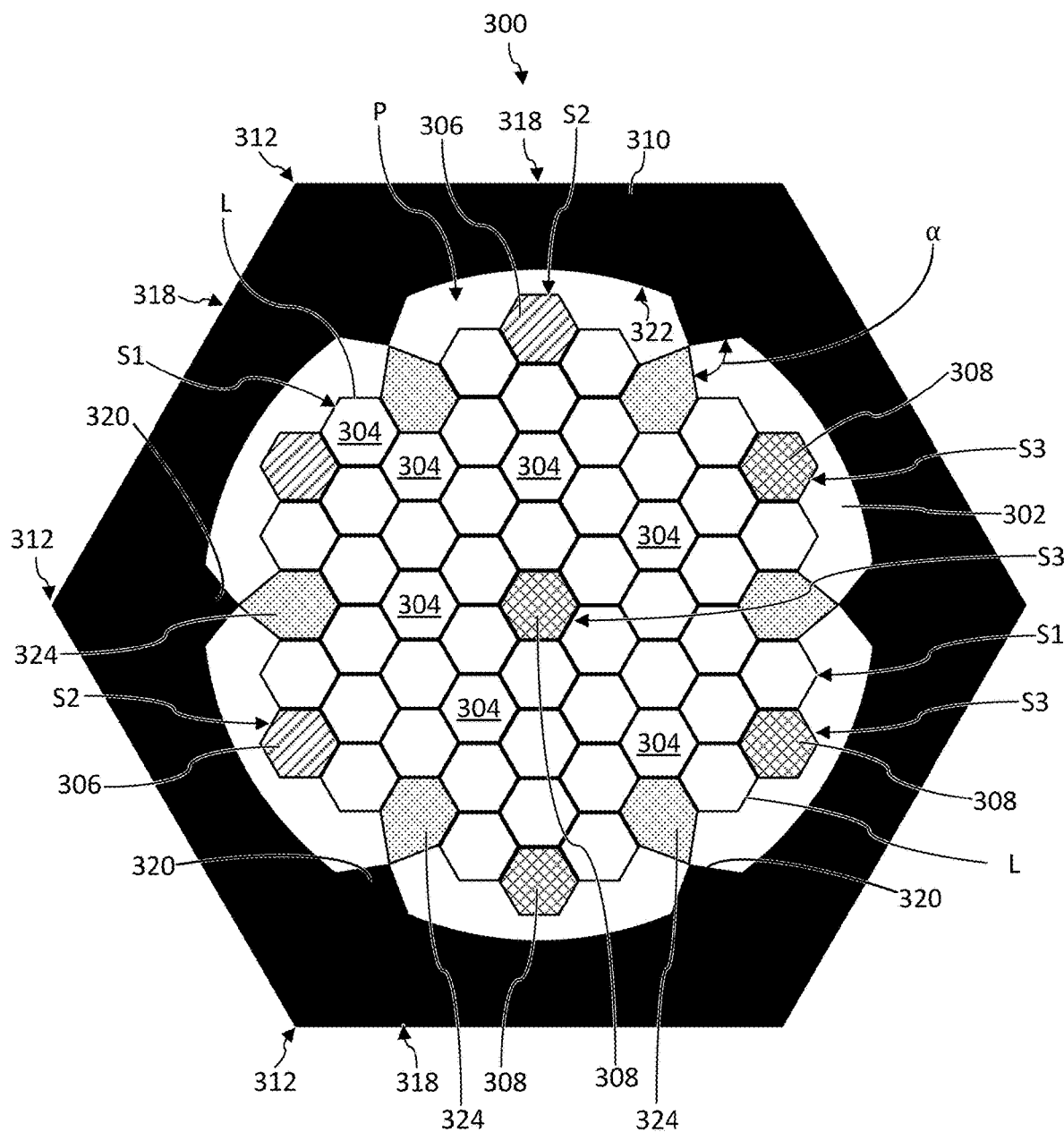
FIG. 3 is a front illustrative view of a calibration target including a plurality of reference lines and hatching patterns.
Figure 4:
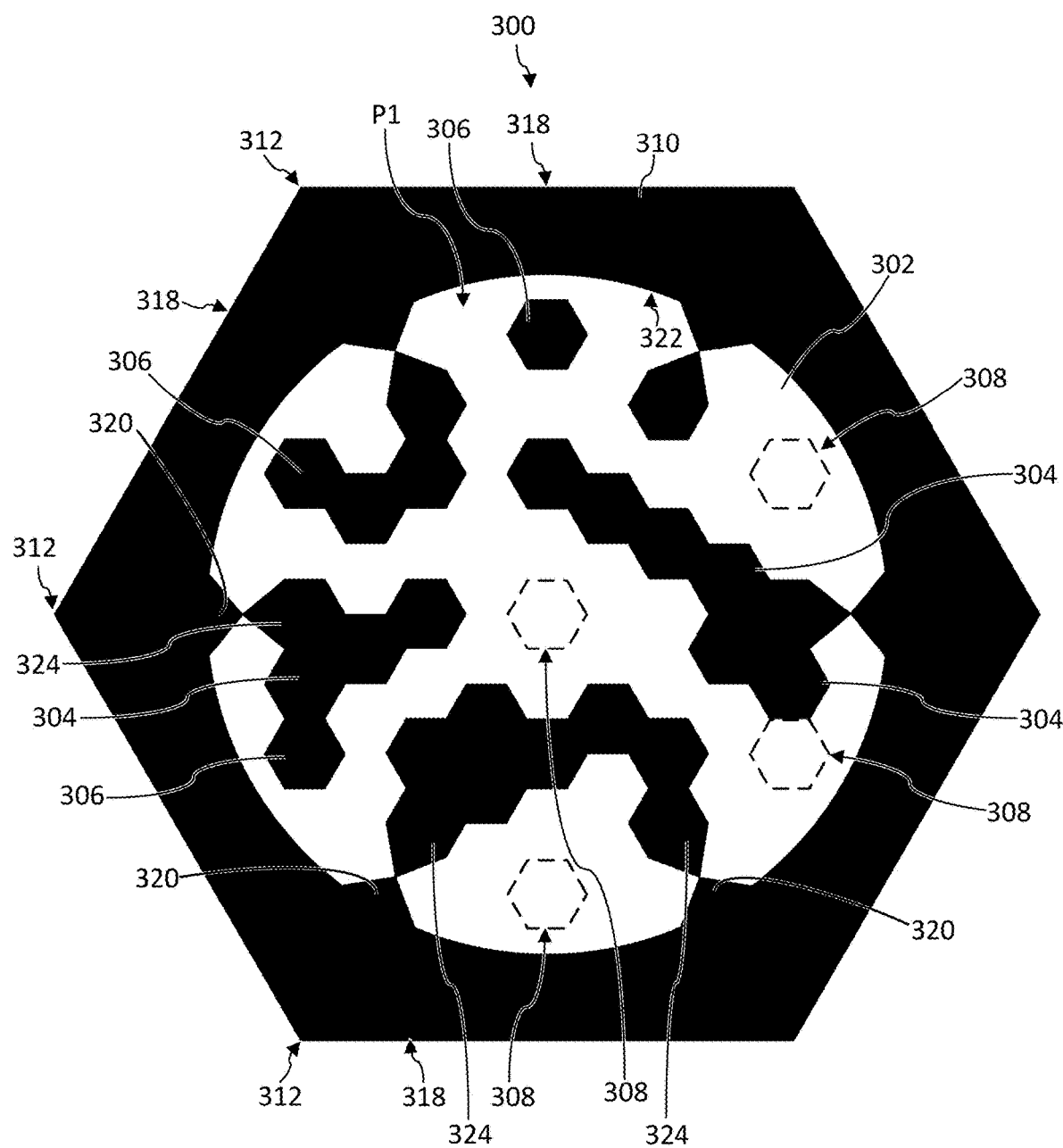
FIG. 4 is a front illustrative view of the calibration target of FIG. 3 including a first pattern.
Figure 5:
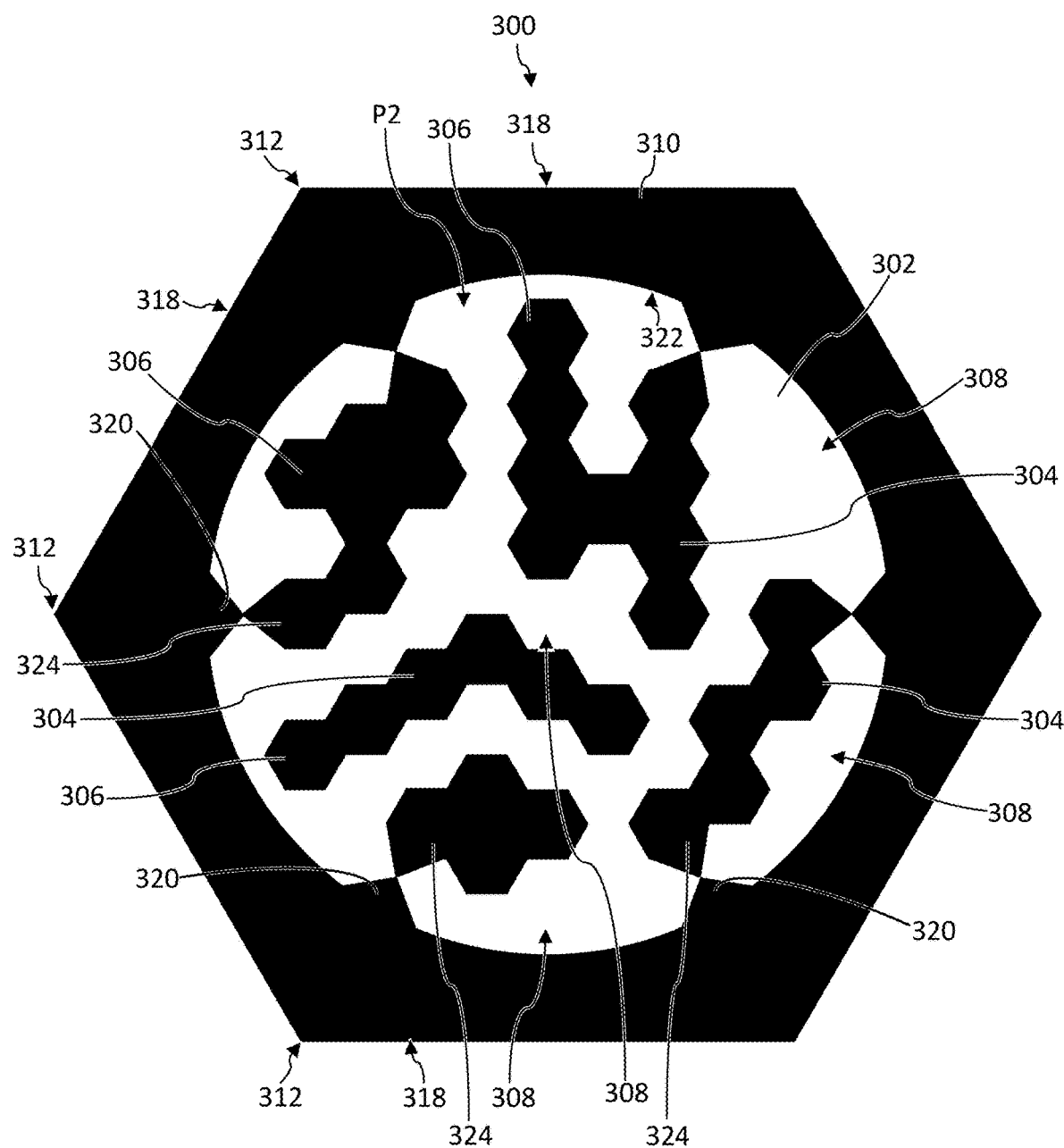
FIG. 5 is a front illustrative view of the calibration target of FIG. 3 including a second pattern.

FIGS. 3-5 are front illustrative views of a calibration target 300. As discussed herein, calibration target 300 is visually displayed on a carrier component and is utilized by autonomous vehicle 100 and autonomy computing system 200 to calibrate various sensors 202 included within autonomous vehicle 100. FIG. 3 shows calibration target 300 including reference lines (L) and reference hatching (e.g., pattern fills) that would typically not be visible to a viewer or sensors of autonomous vehicle 100 when performing processes of calibration, as discussed herein. Rather, and with comparison to calibration targets 300 shown in FIGS. 4 and 5, calibration target 300 shown in FIG. 3 depicts reference lines (L) and reference hatching for the purposes of easily identifying distinct components, sections, and/or features included therein.

As shown in the non-limiting example of FIG. 3, calibration target 300 includes an internal circular region 302, and a plurality of pattern fiducials 304 positioned therein. More specifically, a plurality of pattern fiducials 304 are positioned, disposed, and/or located within internal circular region 302. The plurality of pattern fiducials 304 positioned within internal circular region 302 define, form, and/or create a detectable fiducial pattern (P) (see e.g., FIG. 4) within calibration target 300. The fiducial pattern (P) is used for calibrating sensors 202 of autonomous vehicle 100, as discussed herein. Each of the plurality of pattern fiducials 304 are positioned within circular region 302 in a space (S1) defined by reference lines (L) to form the pattern (P). In the exemplary embodiment shown in FIG. 3, calibration target 300 includes fifty (50) spaces that can contain one of the plurality of pattern fiducials 304 within internal circular region 302. The plurality of pattern fiducials 304 defining pattern (P) include a plurality of shapes, geometries, and/or configurations. In the non-limiting example shown in FIG. 3, and as illustrated by reference lines (L), the plurality of pattern fiducials 304 positioned within internal circular region 302 are hexagonal in shape. However, it is understood that plurality of pattern fiducials 304 can include any geometric shape having point symmetry including, but not limited to, triangles, squares, pentagons, octagons, etc.

The plurality of pattern fiducials 304 forming the pattern (P) in calibration target 300 also include and/or are formed from a detectable color that contrasts the color of internal circular region 302. More specifically, each of the plurality of pattern fiducials 304 positioned within internal circular region 302 and used to form the pattern (P) for calibration target 300, include a color that visually contrasts the color of internal circular region 302 and/or spaces (S1) within internal circular region 302 that do not include a pattern fiducial 304. Briefly turning to FIG. 4, and with continued reference to FIG. 3, internal circular region 302 includes and/or is formed to be white in color, and each of the plurality of pattern fiducials 304 are formed as black, hexagonal fiducials. In other non-limiting examples, internal circular region 302 can be formed to include a yellow color, and the plurality of pattern fiducials 304 can include blue, hexagonal fiducials positioned within internal circular region 302. It is understood that internal circular region 302 and the plurality of pattern fiducials 304 can include any contrasting colors that allow cameras 214 of autonomous vehicle 100 to distinguish between internal circular region 302 and plurality of pattern fiducials 304 (e.g., low saddle point) when capturing an image of calibration target 300 during calibration. Although each space (S1) is capable of including one of the plurality of pattern fiducials 304 therein, it is understood that at least a portion of the spaces (S1) do not include one of the plurality of pattern fiducials 304 when forming the pattern (P) for calibration target 300. In the non-limiting example shown in FIG. 4, and with comparison to FIG. 3, the pattern (P) of calibration target 300 is defined by and/or includes twenty (20) pattern fiducials 304.

As discussed herein, internal circular region 302 includes and/or is formed from a color that contrasts the plurality of pattern fiducials 304. In exemplary embodiments, internal circular region 302 is white, while the plurality of pattern fiducials 304 forming the pattern (P) in calibration target 300 are black. Internal circular region 302 includes the lighter of the two colors to aid in the detection of internal circular region 302 by sensors 202 of autonomous vehicle 100 when performing calibration processes. For example, internal circular region 302 is white to aid and/or improve detection by cameras 214 of autonomous vehicle 100. Similarly, internal circular region 302 is formed as a circle or substantially circular shape to aid and/or improve detection of calibration target 300 by camera 214 of autonomous vehicle 100 when performing the sensor calibration process.

The plurality of pattern fiducials 304 also include a set of constant pattern fiducials 306. That is, the plurality of pattern fiducials 304 positioned or disposed within internal circular region 302 of calibration target 300 include a set of constant pattern fiducials 306 positioned or disposed within predetermined areas or spaces (S2) within internal circular region 302. In the exemplary embodiment, the set of constant pattern fiducials 306 of the plurality of pattern fiducials 304 define a portion of the pattern (P). More specifically, the plurality of pattern fiducials 304 positioned within spaces (S1), and the set of constant pattern fiducials 306 positioned within spaces (P2) in internal circular region 302 collectively define a portion of the pattern (P) included in calibration target 300. The spaces (S2) within internal circular region 302 containing the set of constant pattern fiducials 306 are predetermined, predefined, and/or similarly in all patterns (P) included within calibration targets 300. Additionally, the set of constant pattern fiducials 306 of the plurality of pattern fiducials 304 are also always present and/or visually included (e.g., black shape) in all patterns (P) included within calibration targets 300. In the non-limiting example shown in FIGS. 3-5, calibration target 300 includes three (3) constant pattern fiducials 306 forming the set. However, it is understood that calibration target 300 can include more or less fiducials to form the set of constant pattern fiducials 306. Similar to the plurality of pattern fiducials 304, the set of constant pattern fiducials 306 positioned within internal circular region 302 are hexagonal in shape. However, it is understood that the set of constant pattern fiducials 306 can include any geometric shape having point symmetry including, but not limited to, triangles, squares, pentagons, octagons, etc. Additionally, in non-limiting examples, the set of constant pattern fiducials 306 can include or be formed as the same contrasting color as the plurality of pattern fiducials 304, or alternatively can include a distinct color from the plurality of pattern fiducials 304. The set of constant pattern fiducials 306 can include a color distinct from that of the plurality of pattern fiducials 304, so long as the color of the set of constant pattern fiducials 306 contrasts with the color of internal circular region 302, as discussed herein.

As shown in FIG. 3, calibration target 300 can also include a plurality of void areas 308. The plurality of void areas 308 are included within internal circular region 302. For example, distinct spaces (S3) within internal circular region 302, as defined by reference lines (L), include, define, and/or identify the plurality of void areas 308 of calibration target 300. Each of the plurality of void areas 308 (and the distinct space (S3) within internal circular region 302) do not contain and/or exclude one of the plurality of pattern fiducials 304 from being formed therein. That is, no pattern fiducial 304 is positioned within internal circular region 302 in the plurality of void areas 308 and/or the distinct space (S3) defining the plurality of void areas 308. In the exemplary embodiment, and in combination with the plurality of pattern fiducials 304, and the set of constant pattern fiducials 306, the plurality of void areas 308 formed within in internal circular region 302 define at least a portion of the pattern (P) included in calibration target 300. The plurality of void areas 308 form, define, and/or include at least a portion of the pattern (P) that includes a color (e.g., white) similar to internal circular region 302 and/or contrasting the color of plurality of pattern fiducials 304/set of constant pattern fiducials 306. In another non-limiting example, the plurality of void areas 308 can include a distinct color from internal circular region 302, so long as the color of the plurality of void areas 308 contrasts with the color of plurality of pattern fiducials 304, as discussed herein.

Similar to spaces (S2), the distinct spaces (S3) within internal circular region 302 containing the plurality of void areas 308 are predetermined, predefined, and/or similarly in all patterns (P) included within calibration target 300. Additionally, and as discussed herein, the plurality of void areas 308 are always present and/or visually included (e.g., white shape) in all patterns (P) included within calibration target 300. In the non-limiting example shown in FIGS. 3-5, calibration target 300 includes four (4) void areas 308 included within internal circular region 302. However, it is understood that calibration target 300 can include more or less void areas (e.g., excluding pattern fiducials 304) to form the plurality of void areas 308. Similar to the plurality of pattern fiducials 304/the set of constant pattern fiducials 306, plurality of void areas 308 formed within internal circular region 302 are substantially hexagonal in shape. However, it is understood that the plurality of void areas 308 can include any suitable geometric shape.

In addition to forming or defining a portion of the pattern (P) within calibration target 300, the set of constant pattern fiducials 306 and the plurality of void areas 308 are also utilized by autonomy computing system 200 of autonomous vehicle 100 to determine and/or detect an orientation of calibration target 300. That is, and as discussed herein in detail, an image of calibration target 300 captured by sensors 202 of autonomous vehicle 100 is analyzed to determine the location/orientation of the set of constant pattern fiducials 306 and plurality of void areas 308. The determined location/orientation of the set of constant pattern fiducials 306 and/or the plurality of void areas 308 help determine, at least in part, if sensors 202 of autonomous vehicle 100 require calibration.

In the exemplary embodiment shown in FIG. 3, calibration target 300 also includes a hexagonal border 310 surrounding internal circular region 302. More specifically, hexagonal border 310 substantially surrounds internal circular region 302, and the various features included therein (e.g., plurality of pattern fiducials 304, the set of constant pattern fiducials 306, plurality of void areas 308, etc.). Hexagonal border 310 also defines the outer perimeter of calibration target 300. In a non-limiting example, hexagonal border 310 is formed as an equilateral or regular hexagon including six (6) equal vertices 312, and six (6) equal sides 318 extending between each vertex 312. As discussed herein, hexagonal border 310 of calibration target 300 aids and/or improves in the calibration process, and more specifically provides a first indicator for cameras 214 of autonomous vehicle 100 that cameras 214 are detecting and/or capturing an image of calibration target 300. That is, and as discussed herein, a first process for detecting calibration target 300 is identifying hexagonal border 310 surrounding circular region 302. Similar to the plurality of pattern fiducials 304 forming the pattern (P) in calibration target 300, hexagonal border 310 includes and/or is formed from a detectable color that contrasts the color of internal circular region 302. In the non-limiting example shown, hexagonal border 310 includes a black, hexagonal shape that contrasts white internal circular region 302. In other non-limiting examples, hexagonal border 310 can include a distinct color from plurality of pattern fiducials 304, so long as the color of hexagonal border 310 contrasts with the color of internal circular region 302.

Calibration target 300 can include a plurality of reference points 320. The plurality of reference points 320 are disposed within internal circular region 302 of calibration target 300. More specifically, and as shown in FIG. 3, the plurality of reference points 320 are circumferentially disposed within internal circular region 302 and are disposed around a perimeter 322 of internal circular region 302. In the exemplary embodiment, each reference point of the plurality of reference points 320 is also aligned with and/or positioned directly adjacent a vertex 312 of hexagonal border 310, within internal circular region 302. As a result, although circumferentially disposed around perimeter 322 of internal circular region 302, the plurality of reference points 320 are similarly oriented in a substantially hexagonal pattern or geometry. Calibration target 300 shown in FIG. 3 includes six (6) reference points 320. In the non-limiting example, each of the six (6) reference points 320 aid in analyzing and/or adjusting the camera pose during operation, and/or each reference point 320 corresponds to one of the three measurable degrees of rotation or three measurable degrees of translation. Although six (6) reference points 320 are shown, it is understood that calibration target 300 can include more reference points 320. Additionally, it is understood that the plurality of reference points 320 are similarly included in all patterns (P) included within calibration target 300.

In the non-limiting example shown in FIG. 3, each of the plurality of reference points 320 includes a triangular shape. The peak or vertex of the triangularly shaped reference point 320 extends furthest from perimeter 322 and/or directly adjacent the plurality of pattern fiducials 304 forming the pattern (P) of calibration target 300. In other non-limiting examples (not shown), the plurality of reference points 320 can be formed as any suitable shape or geometry that creates an optimal sub-pixel refinement point-of-measure for sensors 202/cameras 214 of autonomous vehicle 100, as discussed herein. Additionally, and similar to the plurality of pattern fiducials 304 and hexagonal border 310, the plurality of reference points 320 include and/or are formed from a detectable color that contrasts the color of internal circular region 302. In the non-limiting example shown, each of the plurality of reference points 320 include a black, triangular shape that contrasts white internal circular region 302. In other non-limiting examples, the plurality of reference points 320 can include a distinct color from the plurality of pattern fiducials 304 and/or hexagonal border 310, so long as the color of the plurality of reference points 320 contrasts with the color of internal circular region 302.

In the non-limiting example, calibration target 300 also includes a plurality of reference fiducials 324. The plurality of reference fiducials 324 are positioned within internal circular region 302 of calibration target 300. More specifically, and as shown in FIG. 3, each of the plurality of reference fiducials 324 are positioned within internal circular region 302, directly adjacent to one of the plurality of reference points 320. In the exemplary embodiment shown, where the plurality of reference points 320 are formed as triangles, the plurality of reference fiducials 324 are each formed as and/or include an irregular, hexagonal shape. A vertex of the irregular, hexagonal reference fiducials 324 extends directly toward and/or is aligned with the vertex or peak of the correspond reference point 320 disposed circumferentially around internal circular region 302. During the calibration process, the adjacent vertices of the plurality of reference points 320 and the plurality of reference fiducials 324 create an improved or optimum sub-pixel refinement point-of-measurement for cameras 214 of autonomous vehicle 100. For example, an angle (a) between each reference point 320 and corresponding reference fiducial 324 is approximately 90°, creating six (6) measurable saddle points within calibration target 300 for detection. The created saddle points in turn aids in analyzing and/or adjusting the camera pose during operation, improve sub-pixel refinement processes, and/or each reference fiducial 324 (and corresponding reference point 320) correlate to one of the three measurable degrees of rotation or three measurable degrees of translation. Six (6) reference fiducials 324 are shown in calibration target 300, however, it is understood that calibration target 300 can include an equal number of reference points 320 and corresponding reference fiducials 324, positioned adjacent to one of the reference points 320.

In the exemplary embodiment, the plurality of reference fiducials 324 define a portion of the pattern (P). More specifically, the plurality of pattern fiducials 304 including the set of constant pattern fiducials 306, the plurality of void areas 308, and the plurality of reference fiducials 324 collectively define the pattern (P) included in calibration target 300. Similar to the set of constant pattern fiducials 306, the plurality of reference fiducials 324 are similarly included within all patterns (P) for calibration target 300, and/or one reference fiducial 324 is formed or positioned directly adjacent a corresponding reference point 320 within internal circular region 302. Additionally, the plurality of reference fiducials 324 are always present and/or visually included (e.g., black, irregular hexagon) in all patterns (P) included within calibration target 300. In the non-limiting example shown in FIGS. 3-5, calibration target 300 includes six (6) reference fiducials 324 positioned directly adjacent a corresponding reference point 320. The plurality of reference fiducials 324 positioned within internal circular region 302 can include or be formed as the same contrasting color as the plurality of pattern fiducials 304 and/or the plurality of reference points 320. Alternatively, the plurality of reference fiducials 324 can include a distinct color from the plurality of pattern fiducials 304 and/or the plurality of reference points 320. The plurality of reference fiducials 324 can include a color distinct from that of the plurality of pattern fiducials 304 and/or the plurality of reference points 320, so long as the color of the plurality of reference fiducials 324 contrasts with the color of internal circular region 302, as discussed herein.

FIGS. 4 and 5 are exemplary embodiments of calibration target 300 include distinct patterns (P1, P2). More specifically, FIG. 4 shows calibration target 300 including a first pattern (P1) and FIG. 5 show calibration target 300 including second pattern (P2), distinct from the first pattern (P1) shown in FIG. 4. As discussed herein, calibration target 300 is visually displayed on a physical carrier component to facilitate a calibration process for autonomous vehicle 100 (see, FIG. 1) and sensors 202 included thereon. It is understood that similarly numbered and/or named components may function in a substantially similar fashion. Redundant explanation of these components has been omitted for clarity.

As shown in FIGS. 4 and 5, and as discussed herein, patterns (P1, P2) of calibration targets 300 are defined by the plurality of pattern fiducials 304, the set of constant pattern fiducials 306, the plurality of void areas 308, and the plurality of reference fiducials 324 disposed within internal circular region 302. Additionally, each of the plurality of pattern fiducials 304 including the set of constant pattern fiducials 306, and the plurality of reference fiducials 324 defining at least a portion of the patterns (P1, P2) are formed and/or include a contrasting color (e.g., black) when compared to the color of internal circular region 302. In the non-limiting example shown in FIG. 4, the plurality of void areas 308 are shown in phantom to visually represent or highlight the four (4) plurality of void areas 308 included within calibration target 300. However, it is understood the plurality of void areas 308 are that not visible and/or visually represented in calibration target 300, as shown in the non-limiting example in FIG. 5. Rather, autonomy computing system 200 used to analyze calibration target 300 during the calibration process can detect and/or determine the position and/or orientation of the plurality of void areas 308 based on, at least in part, stored information and/or analytics.

In the non-limiting example shown in FIG. 4, the first pattern (P1) for calibration target 300 is defined by twenty (20) fiducials of the plurality of pattern fiducials 304 having a black or dark color, and twenty-eight (28) fiducials including a white or contrasting color. The twenty (20) black fiducials and twenty-eight (28) white fiducials defining the first pattern (P1) including three (3) fiducials forming the set of constant pattern fiducials 306 included in the plurality of pattern fiducials 304. Additionally, the first pattern (P1) also includes the four (4) plurality of void areas 308, as discussed herein, and six (6) reference fiducials of the plurality of reference fiducials 324. Each one of the six (6) reference fiducials 324 are positioned directly adjacent one of the six (6) plurality of reference points 320 circumferentially disposed around and within internal circular region 302. Additionally, at least one of the six (6) reference fiducials 324 are positioned adjacent one or more of the plurality of pattern fiducials 304 and/or the set of constant pattern fiducials 306.

The second pattern (P2) of calibration target 300, as shown in FIG. 5, is distinct from the first pattern (P1) shown in FIG. 4. For example, the second pattern (P2) includes twenty-five (25) fiducials of the plurality of pattern fiducials 304 having a black or dark color and twenty-three (23) fiducials including a white or contrasting color. The second pattern (P2) also includes three (3) fiducials forming the set of constant pattern fiducials 306. Similar to the first pattern (P1), second pattern (P2) includes the three (3) fiducials forming the set of constant pattern fiducials 306 located in their predetermined space (S2) (see, FIG. 3), and the four (4) plurality of void areas 308 located in distinct spaces (S3) (see, FIG. 3). Additionally, calibration target 300 including the second pattern (P2), includes the six (6) reference fiducials of the plurality of reference fiducials 324 positioned directly adjacent to the six (6) plurality of reference points 320 circumferentially disposed around and within internal circular region 302.

Figure 6:
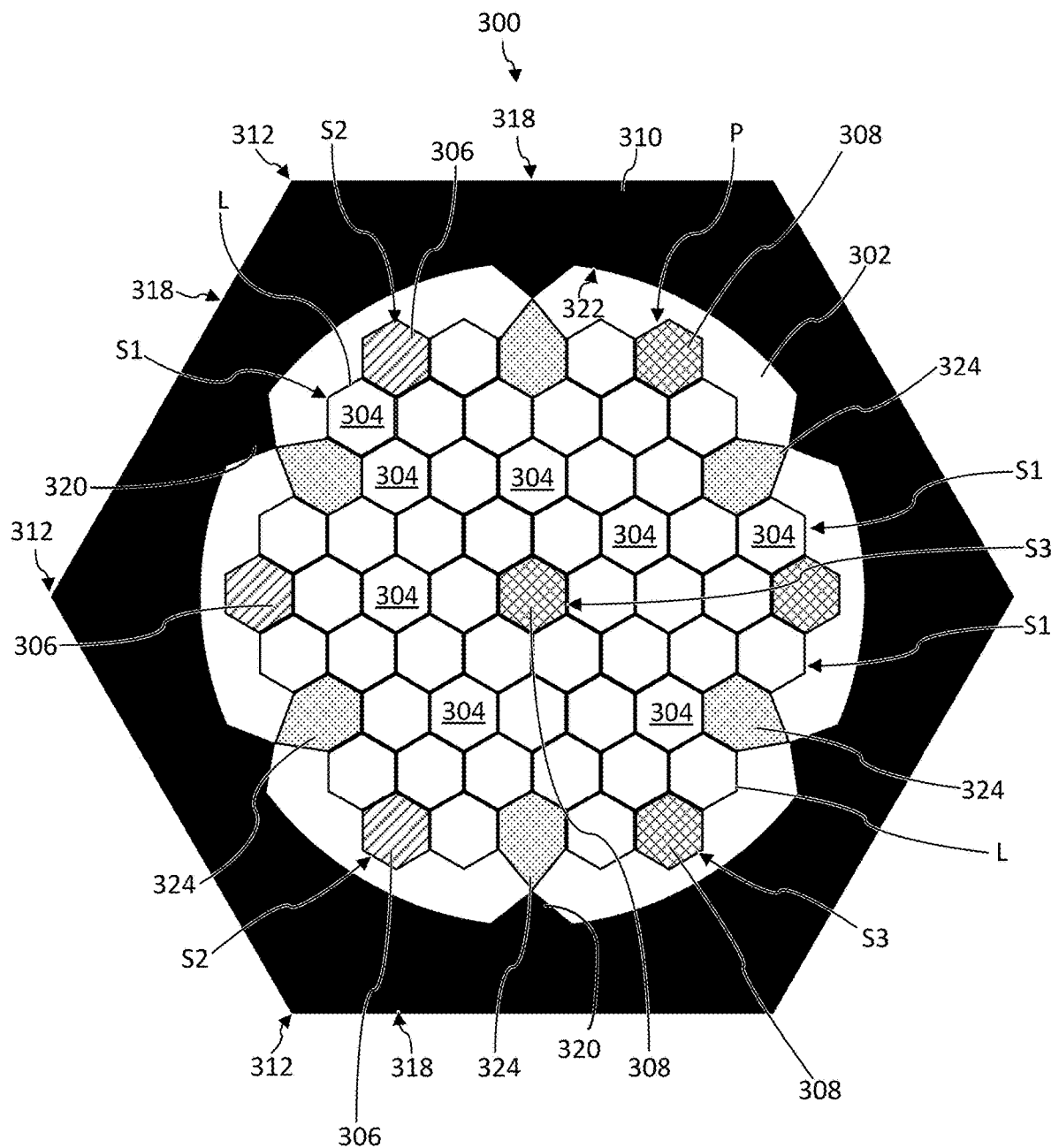
FIG. 6 is a front illustrative view of a calibration target.

FIG. 6 is another non-limiting example of calibration target 300. Similar to FIG. 3, FIG. 6 shows calibration target 300 with reference lines (L) and reference hatching (e.g., pattern fills) that would typically not be visible to a viewer or sensors 202 of autonomous vehicle 100 when performing processes of calibration, as discussed herein. Rather, FIG. 6 depicts reference lines (L) and reference hatching for the purposes of disclosing distinct components, sections, and/or features of calibration target 300. It is understood that similarly numbered and/or named components may function in a substantially similar fashion. Redundant explanation of these components has been omitted for clarity.

In the exemplary embodiment shown in FIG. 6, the plurality of reference points 320 are aligned with equal sides 318 of hexagonal border 310. That is, each of the plurality of reference points 320 are aligned with and/or positioned directly in the center of equal sides 318 of hexagonal border 310, such that each reference point 320 is equidistant between two adjacent vertices 312 of hexagonal border 310. Each of the plurality of reference fiducials 324 are disposed within internal circular region 302, directly adjacent a corresponding reference point 320 circumferentially disposed around perimeter 322 of internal circular region 302. Additionally, each of the plurality of reference fiducials 324 are aligned with equal sides 318 of hexagonal border 310.

Figure 7:
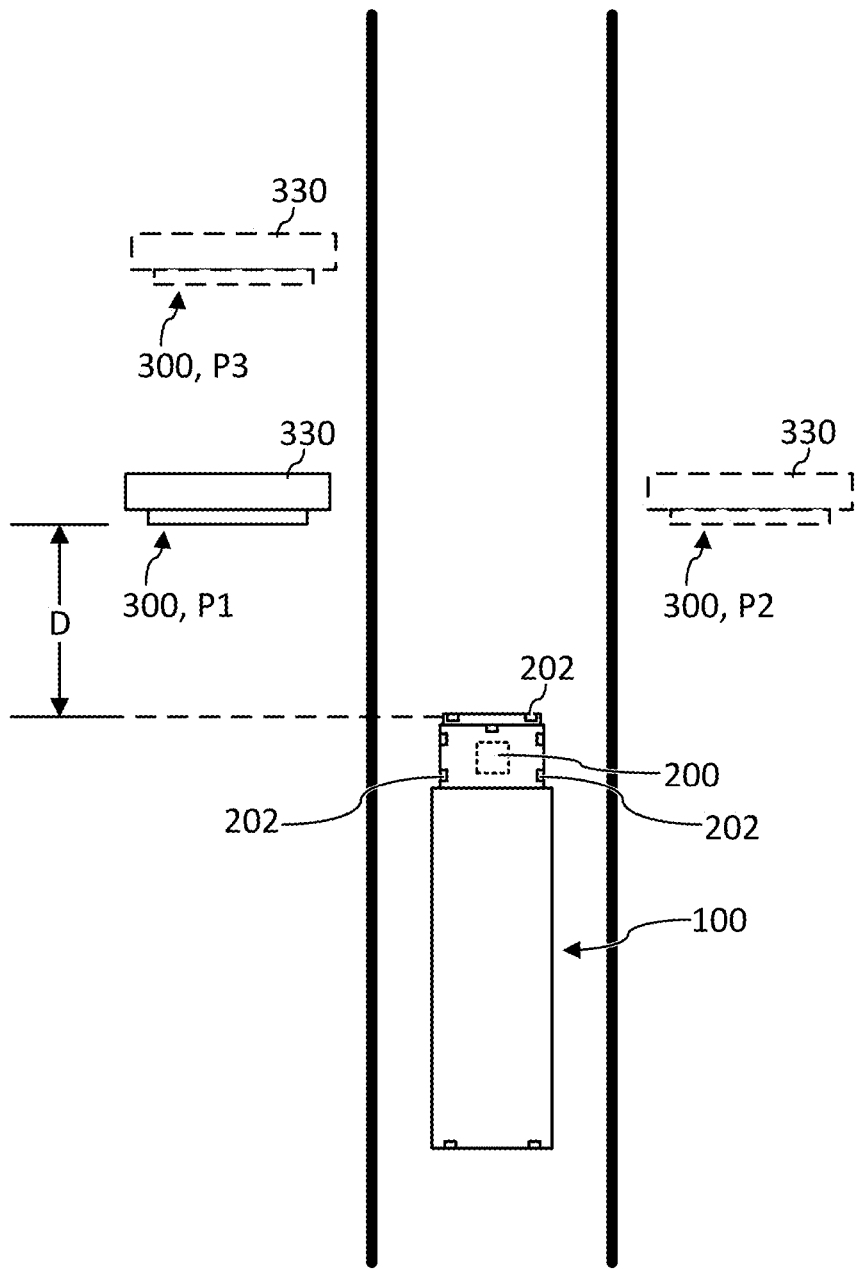
FIG. 7 is a top view of an autonomous vehicle and a plurality of calibration targets.

FIG. 7 is a top view of autonomous vehicle 100 including autonomy computing system 200 and sensors 202, and at least one calibration target 300. As discussed herein, autonomy computing system 200 of autonomous vehicle 100 can utilize calibration target 300 to determine if at least one sensor 202 requires calibration.

In the non-limiting example, autonomous vehicle 100 approaches one or more calibration target 300 to begin the calibration process. That is, autonomous vehicle 100, and more particularly sensors 202 of autonomous vehicle 100, are positioned a predetermined distance (D) away from calibration target 300 to initiate a calibration process for sensors 202. As shown, calibration target 300 is visually displayed on a carrier component 330 for autonomous vehicle 100. More specifically, calibration target 300, and the various portions forming the pattern (P1) therein, is positioned on, perceptibly presented, and/or visually displayed on carrier component 330 positioned substantially adjacent to a road or path autonomous vehicle 100 uses when performing the calibration process discussed herein. Carrier component 330 can be any suitable device or component that facilitates the displaying and the detecting of calibration target 300. For example, carrier component 330 can be a sign or post including a visual print out of calibration target 300 positioned thereon. In another non-limiting example, carrier component 330 can be formed as a display or screen (e.g., television monitor, digital road sign) that displays a digital representation of calibration target 300. In a further example, carrier component 330 is a portion of the road or path that is not driven on and/or adjacent autonomous vehicle 100, and calibration target 300

(and the pattern (P) included therein) is painted directly on the portion of the road forming carrier component 330.

Once positioned the predetermined distance (D) from calibration target 300, sensors 202 provide a signal used in the calibration process. More specifically, sensors 202 of autonomous vehicle 100 generate an output signal relating to and/or including calibration target 300. In a non-limiting example where sensor 202 of autonomous vehicle 100 includes camera 214, camera 214 captures at least one image of calibration target 300 (e.g., output signal) include the pattern (P1) included therein. As discussed herein, the pattern (P1) of calibration target 300 is defined by the plurality of pattern fiducials 304 including the set of constant pattern fiducials 306, the plurality of void areas 308, and the plurality of reference fiducials 324. Additionally, the image captured by camera 214 of autonomous vehicle 100 can also include a depiction of the plurality of reference points 320 disposed within internal circular region 302, as well as internal circular region 302 and hexagonal border 310, respectively.

Once output signals (e.g., captured image) relating to calibration target 300 are generated, autonomy computing system 200 of autonomous vehicle 100 obtains each output signal from each sensor 202, and analyzes the output signals. In a non-limiting example, analyzing the various output signals includes first determining, based on the obtained output signals, whether the obtained output signals have detected and/or captured calibration target 300 or a distinct object (e.g., hexagonal picture or advertisement). Autonomy computing system 200 may determine the obtained output signals have captured calibration target 300 by first detecting and/or identifying hexagonal border 310. Once hexagonal border 310 is identified, a location and/or orientation of the various features forming the pattern (P1) within calibration target 300, and/or the plurality of reference points 320 of calibration target 300 are identified, detected, and/or determined. As discussed herein, the various features of calibration target 300 forming the pattern (P1) included therein include the plurality of pattern fiducials 304 including the set of constant pattern fiducials 306, the plurality of void areas 308, and the plurality of reference fiducials 324. For example, the plurality of constant pattern fiducials 306 and the plurality of void areas 308 included within the pattern (P1) may first be detected, analyzed, and/or identified to determine an orientation of calibration target 300. Next, the plurality of pattern fiducials 304 included within internal circular region 302 are detected, to compare the pattern (P1) to predetermined and/or predefined patterns of calibration target 300. Once the detected pattern (P1) is identified and/or associated with a predefined pattern, a location of reference points 320 within pattern (P1) are known or determined. This in turn facilitates the analyzing, processing, and/or evaluating the sub-pixel refinement point-of-measurement formed between each of the plurality of reference points 320 and the corresponding fiducial of the plurality of reference fiducials 324 included within calibration target 300. In a non-limiting example, and as discussed herein, evaluating the sub-pixel refinement point-of-measurement created by the six (6) reference points 320/reference fiducials 324 aids in analyzing and/or adjusting the camera pose during operation, where each reference point 320 corresponds to one of the three measurable degrees of rotation or three measurable degrees of translation.

Based on the analyzed output signals, autonomy computing system 200 of autonomous vehicle 100 can determine that at least one sensor 202 of the plurality of sensors 202 requires calibration or alternatively, each sensor 202 of autonomous vehicle 100 is operating as desired. In a non-limiting example, after analyzing a plurality of captured images taken by various cameras 214 of autonomous vehicle 100, and subsequently determining the location and orientation of the various features forming the pattern (P1) in calibration target 300, autonomy computing system 200 can determine that one of the cameras 214 requires calibration. Where four cameras 214 generate four captured images of calibration target 300, autonomy computing system 200 can analyze each captured image. Based on, at least in part, the known position of each camera 214 capturing the images of calibration target 300, autonomy computing system 200 can analyze/compare the captured images, and/or the determined location and/or orientations of the plurality of pattern fiducials 304 including the set of constant pattern fiducials 306, the plurality of void areas 308, and the plurality of reference fiducials 324. In doing so, autonomy computing system 200 can identify or determine that one of the captured images shows, for example, each of the set of constant pattern fiducials 306 included in the pattern (P) rotated 20 degrees (20°) when compared to the determined location of the set of constant pattern fiducials 306 in all other captured images. As such, the camera 214 of autonomous vehicle 100 capturing the "rotated" image can undergo calibration processes for correction.

In another non-limiting example, analyzed, output signals (e.g., captured images) may not readily identify the sub-pixel refinement points-of-measure created by the six (6) reference points 320/reference fiducials 324 within calibration target 300. Without being able to adequately capture and analyze the sub-pixel refinement points-of-measure, autonomy computing system 200 may not accurately calibrate and/or determine the camera(s) pose during operation. In the example, autonomy computing system 200 can continuously calibrate and/or adjust the focus of the lenses included in cameras 214 of autonomous vehicle 100, until the sub-pixel refinement points-of-measure included in calibration target 300 are identifiable, detectable, and/or measurable. Ultimately, the calibration (e.g., adjustment of focus) of sensors 202 (e.g., camera(s) 214) allows for autonomy computing system 200 to determine the camera(s) pose during operation of autonomous vehicle 100.

It is understood that the examples of calibration performed by autonomy computing system 200 of autonomous vehicle 100 discussed herein are exemplary. As such, additional processes and/or types of calibration for sensors 202 within autonomous vehicle 100 can be performed using calibration target 300. Additionally, although discussed herein using a single calibration target 300 including a pattern (P1), it is understood that multiple calibration targets 300, each including distinct patterns (P1, P2, P3), can be utilized to perform calibration processes on sensors 202 of autonomous vehicle 100. In this non-limiting example, the various sensors 202 can generate output signals for each of the plurality of calibration targets 300, and autonomy computing system 200 can analyze each output signal for each calibration target 300 to determine if one or more sensors 202 require calibration, as similarly discussed herein.

Figure 8:
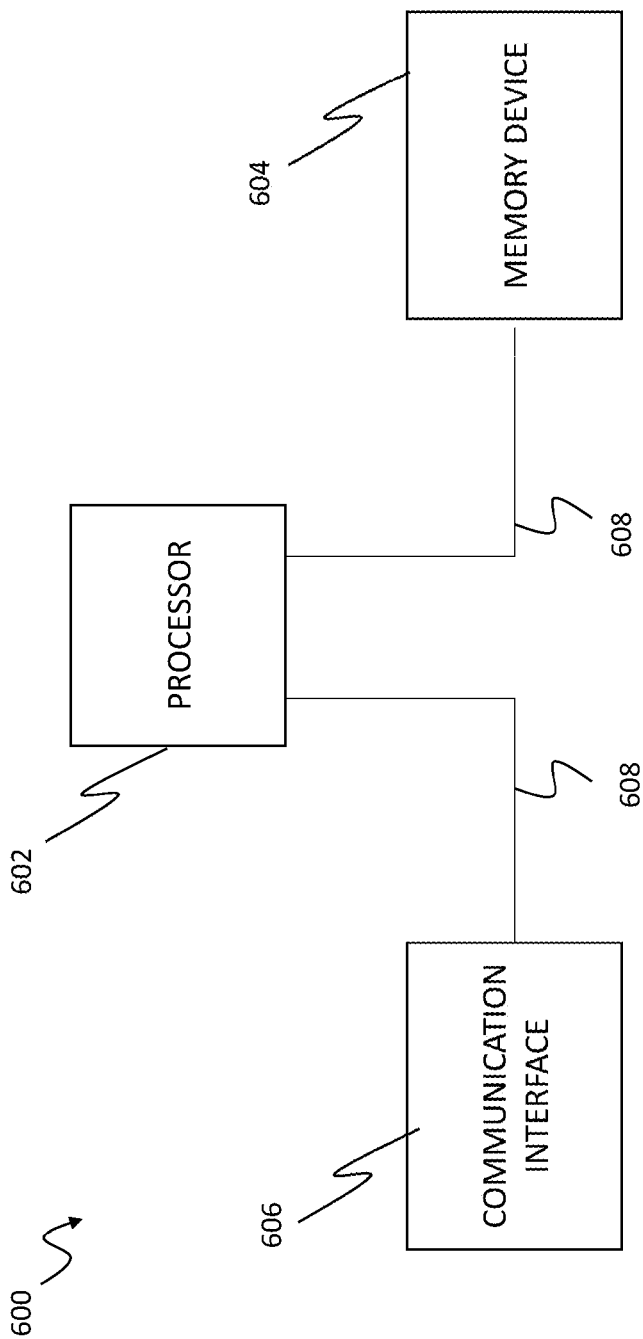
FIG. 8 is a block diagram of an example computing device.

FIG. 8 is a block diagram of an example computing device 600. Computing device 600 includes a processor 602 and a memory device 604. The processor 602 is coupled to the memory device 604 via a system bus 608. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 604 includes one or more devices that enable information, such as executable instructions or other data (e.g., sensor data), to be stored and retrieved. Moreover, the memory device 604 includes one or more computer readable media, such as, without limitation, dynamic random-access memory (DRAM), static random-access memory (SRAM), a solid state disk, or a hard disk. In the example embodiment, the memory device 604 stores, without limitation, application source code, application object code, configuration data, additional input events, application states, assertion statements, validation results, or any other type of data. The computing device 600, in the example embodiment, may also include a communication interface 606 that is coupled to the processor 602 via system bus 608. Moreover, the communication interface 606 is communicatively coupled to data acquisition devices.

In the example embodiment, processor 602 may be programmed by encoding an operation using one or more executable instructions and providing the executable instructions in the memory device 604. In the example embodiment, the processor 602 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the calibration targets and systems described herein includes at least one of: (a) improve detection of the calibration targets by sensors of an autonomous vehicle, (b) improved or optimum sub-pixel refinement point-of-measurement for sensors of the autonomous vehicle, (c) improved camera pose calculations, (d) additional detection points and features corresponding to three degrees of freedom for three-dimensional rotation and three degrees of freedom for three-dimensional translation, or (e) improved calibration for sensors of the autonomous vehicle by utilizing the calibration targets.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the term's processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A calibration target visually displayed on a carrier component, the calibration target comprising:
   an internal circular region;
   a plurality of pattern fiducials positioned within the internal circular region, the plurality of pattern fiducials defining a fiducial pattern;
   a plurality of reference points circumferentially disposed around a perimeter defining the internal circular region; and
   a hexagonal border surrounding the internal circular region including the plurality of pattern fiducials and the plurality of reference points,
   wherein each of the plurality of reference points extend from the hexagonal border into the internal circular region, adjacent at least one of the plurality of pattern fiducials positioned within the internal circular region.

2. The calibration target of claim 1, further comprising a plurality of reference fiducials positioned within the internal circular region, wherein each reference fiducial of the plurality of reference fiducials is positioned within the internal circular region directly adjacent to one of the plurality of reference points.

3. The calibration target of claim 2, wherein the plurality of reference points include a triangular shape, and the plurality of reference fiducials include an irregular, hexagonal shape.

4. The calibration target of claim 1, wherein the plurality of pattern fiducials includes a set of constant pattern fiducials disposed within a predetermined space of the internal circular region, the set of constant pattern fiducials defining a portion of the fiducial pattern.

5. The calibration target of claim 1, further comprising a plurality of void areas within the internal circular region, the plurality of void areas excluding one of the plurality of pattern fiducials from being positioned therein.

6. The calibration target of claim 5, wherein at least one of the plurality of void areas includes a hexagonal shape.

7. The calibration target of claim 1, wherein the plurality of pattern fiducials include a hexagonal shape.

8. The calibration target of claim 1, wherein each of the plurality of reference points are aligned with one of a vertex or a side of the hexagonal border surrounding the internal circular region.

9. A system comprising:
   at least one calibration target visually displayed on a carrier component and including:
      an internal circular region;
      a plurality of pattern fiducials positioned within the internal circular region, the plurality of pattern fiducials defining a fiducial pattern;
      a plurality of reference points circumferentially disposed within and around a perimeter of the internal circular region; and
      a hexagonal border surrounding the internal circular region including the plurality of pattern fiducials and the plurality of reference points; and
   an autonomous vehicle in operable communication with the at least one calibration target, the autonomous vehicle including:
      a plurality of sensors configured to generate an output signal relating to the at least one calibration target; and
      at least one autonomous vehicle computing system in electronic communication with the plurality of sensors, the at least one autonomous vehicle computing system configured to calibrate the plurality of sensors by performing processes including:
         obtaining the generated output signal generated by each of the plurality of sensors;
         determining, based on the obtained output signals, a location and an orientation for each of the plurality of pattern fiducials and each of the plurality of reference points; and
         calibrating at least one sensor of the plurality of sensors based on at least one of the determined location or the determined orientation for each of the plurality of pattern fiducials or each of the plurality of reference points.

10. The system of claim 9, wherein the plurality of sensors of the autonomous vehicle includes a camera, wherein the generated output signal is a captured image of the at least one calibration target.

11. The system of claim 9, wherein the at least one calibration target further includes a plurality of reference fiducials positioned within the internal circular region, wherein each reference fiducial of the plurality of reference fiducials is positioned within the internal circular region directly adjacent to one of the plurality of reference points.

12. The system of claim 11, wherein the plurality of reference points of the at least one calibration target include a triangular shape, and the plurality of reference fiducials of the at least one calibration target include an irregular, hexagonal shape.

13. The system of claim 9, wherein the plurality of pattern fiducials of the at least one calibration target includes a set of constant pattern fiducials disposed within a predetermined space of the internal circular region, the set of constant pattern fiducials defining a portion of the fiducial pattern.

14. The system of claim 9, wherein the at least one calibration target further includes a plurality of void areas within the internal circular region, the plurality of void areas excluding one of the plurality of pattern fiducials from being positioned therein.

15. The system of claim 14, wherein at least one of the plurality of void areas of the at least one calibration target includes a hexagonal shape.

16. The system of claim 9, wherein the plurality of pattern fiducials of the at least one calibration target include a hexagonal shape.

17. The system of claim 9, wherein each of the plurality of reference points are aligned with one of a vertex or a side of the hexagonal border surrounding the internal circular region.

18. The system of claim 9, wherein the at least one calibration target includes:
    a first calibration target including a first plurality of pattern fiducials defining a first fiducial pattern; and
    a second calibration target including a second plurality of pattern fiducials defining a second fiducial pattern, the second fiducial pattern of the second calibration target distinct from the first fiducial pattern of the first calibration target.

19. A method of calibrating a plurality of sensors of an autonomous vehicle, the method comprising:
    obtaining an output signal generated by each of the plurality of sensors, the output signal relating to a calibration target visually displayed on a carrier component and including:
        an internal circular region;
        a plurality of pattern fiducials positioned within the internal circular region, the plurality of pattern fiducials defining a fiducial pattern;
        a plurality of reference points circumferentially disposed within and around a perimeter of the internal circular region; and
        a hexagonal border surrounding the internal circular region including the plurality of pattern fiducials and the plurality of reference points;
    determining, based on the obtained output signals, a location and an orientation for each of the plurality of pattern fiducials and each of the plurality of reference points; and
    calibrating at least one sensor of the plurality of sensors based on at least one of the determined location or the determined orientation for each of the plurality of pattern fiducials or each of the plurality of reference points.

20. The method of claim 19, wherein the determining of the locations and the orientations for each of the plurality of pattern fiducials and each of the plurality of reference points further comprises:
    determining the location and the orientation of:
        each of a set of constant pattern fiducials disposed within a predetermined space of the internal circular region of the calibration target;
        each of a plurality of void areas within the internal circular region, the plurality of void areas excluding one of the plurality of pattern fiducials from being positioned therein; and
        each of a plurality of reference fiducials positioned within the internal circular region, wherein each reference fiducial of the plurality of reference fiducials is positioned within the internal circular region directly adjacent to one of the plurality of reference points.

* * * * *